United States Patent
Ozanne et al.

(10) Patent No.: US 7,063,792 B2
(45) Date of Patent: Jun. 20, 2006

(54) METHOD FOR SEPARATING METALS SUCH AS ZIRCONIUM AND HAFNIUM

(75) Inventors: Noël Ozanne, Grenoble (FR); Marc Lionel Lemaire, Villeurbanne (FR); Alain Jean-Louis Guy, Pontcarre (FR); Jacques Henri Foos, Orsay (FR); Stéphane Pellet-Rostaing, Villeurbanne (FR); Frédéric Chitry, Villeurbanne (FR)

(73) Assignee: Compagnie Europeenne du Zirconium CEZUS, Courbevoie (FR)

( * ) Notice: Subject to any disclaimer, the term of this patent is extended or adjusted under 35 U.S.C. 154(b) by 222 days.

(21) Appl. No.: 10/380,261

(22) PCT Filed: Sep. 10, 2001

(86) PCT No.: PCT/FR01/02806

§ 371 (c)(1),
(2), (4) Date: Jun. 19, 2003

(87) PCT Pub. No.: WO02/20408

PCT Pub. Date: Mar. 14, 2002

(65) Prior Publication Data

US 2004/0011739 A1    Jan. 22, 2004

(30) Foreign Application Priority Data

Sep. 11, 2000  (FR) .................................. 00 11538

(51) Int. Cl.
*B01D 11/00* (2006.01)

(52) U.S. Cl. ...................... 210/638; 210/651; 210/735; 210/634; 210/682; 210/684; 210/688; 210/639; 210/644; 210/912; 423/21.5; 423/9; 423/21.1; 423/8; 423/10

(58) Field of Classification Search ................. 210/638, 210/651, 735, 634, 682, 684, 688, 639, 644, 210/912; 423/21.5, 9, 21.1, 8, 10
See application file for complete search history.

(56) References Cited

U.S. PATENT DOCUMENTS 5,766,478 A * 6/1998 Smith et al. ................ 210/638
5,961,833 A * 10/1999 Green et al. ............... 210/638

FOREIGN PATENT DOCUMENTS

FR      2 794 032 A     12/2000
JP      6323711         3/1988

OTHER PUBLICATIONS

Database Accession No. 131:220264 XP002168087 "Separation of gadolinium and lanthanum by nanofiltration-complexation in aqueous medium"*.

* cited by examiner

*Primary Examiner*—W. L. Walker
*Assistant Examiner*—K S Menon
(74) *Attorney, Agent, or Firm*—Kenyon & Kenyon LLP

(57) ABSTRACT

A method for separating a metal (a) from a metal (2), preferably zirconium from hafnium, which consists in dissolving said metals in an aqueous solution wherein said metals are in a state preventing them from passing through a nanofiltration membrane; treating the aqueous medium with a ligand, for example EDTA, which is complexed with metal (1) and/or metal (2), then in passing the resulting treated medium on a filtering membrane allowing through the ligand-metal complexes, but retaining the metals not complexed with the ligand.

26 Claims, 1 Drawing Sheet

METHOD FOR SEPARATING METALS SUCH AS ZIRCONIUM AND HAFNIUM

FIELD OF THE INVENTION

The present invention relates to a process which allows the separation of certain metals, in particular the separation of zirconium and hafnium.

BACKGROUND INFORMATION

Zirconium has a very low neutron capture cross section and, for this reason, is used in nuclear reactors. the ore zircon, however, always contains hafnium, in a proportion of approximately 1 to 3% by weight. In contrast to zirconium, hafnium strongly absorbs neutrons. The use of zirconium in the nuclear field, therefore, requires the preliminary removal of hafnium, a content of less than 100 ppm often being recommended.

Zirconium has other applications in which its purification is desirable. For example, the removal of hafnium is also sought in stainless superalloys.

Hafnium and zirconium have very similar properties and their separation. is thereby rendered extremely difficult. To do this, a carbochlorination of the ore is performed, which produces the tetrachlorides $ZrCl_4$ and $HfCl_4$, and then a separation, either by extractive distillation of the two tetrachlorides or by liquid—liquid extraction after dissolving the chlorides, is carried cut. In the latter case, this results in the formation of $ZrO_2$ and $HfO_2$, which then requires a further carbochlorination of the zirconium before moving onto the phase of recovery of the metal Zr. The first process, which is more efficient, consists of a distillation of molten salts which makes it possible to retain the tetrachloride form, thus dispensing with the second carbochlorination. The temperature is generally comprised between 250 and 550° C. See, for example, French Published Patent Application No. FR 2 250 707 and U.S. Pat. No. 4,021,531.

SUMMARY

It is an object of the invention to provide a novel process which makes it possible to efficiently separate zirconium from hafnium.

Another object of the invention is to provide such process which may be applied to the separation of zirconium and hafnium from the starting ore or from any fraction.

Another object of the invention is to provide such a process which operates at lower temperatures than the prior processes and with reduced operating costs.

Yet another object of the invention is to provide such a process which makes it possible to separate zirconium from hafnium and to exceed the degrees of purity obtained by the prior processes.

Yet another object of the invention is to be able to apply this process to the separation of other metals.

F. Chitry et al. (J. Radioanalytical and Nuclear Chemistry, 1999, 240, 2, 931–934) describe the separation of gadolinium and lanthanum by a nanofiltration-complexing in aqueous medium method. This method is based on the selective complexing of a ligand of the EDTA family, say DTPA. The DTPA preferentially complexes the gadolinium, which allows the authors to separate these metals over a nanofiltration membrane, which retains the gadolinium-DTPA complexes and allows the noncomplexed lanthanum to pass.

The inventors have tried to transfer the teaching of these studies to the separation of zirconium and hafnium. Acidic pH conditions were adopted under which zirconium and hafnium and their complexes with compounds of the EDTA type are soluble. A first nanofiltration experiment with zirconium and hafnium salts and without use of ligand was carried out at a pH between 2 and 5. The membrane used had a cutoff threshold of 500 g/mol. The inventors found, with surprise, a retention of zirconium and hafnium of greater than 99.9%, whereas zirconium and hafnium have respective molar masses of 91 g/mol and 179 g/mol, much lower than the cutoff threshold of the membrane used (see example 1).

Here it is hypothesized that zirconium and hafnium, once hydrolyzed in the aqueous phase, have a tendency to form polymers and/or copolymers of the $—(O—M(OH)_2)_n—$ type, the molar mass of which is probably greater than the cutoff threshold of the nanofiltration membranes, which excludes them from being used and excludes the application of the method disclosed in the above document.

Additionally, it has been subsequently found, surprisingly, that it is possible to separate zirconium and hafnium by using a complexing-filtration method operating according to an entirely different principle.

This method may be extended to the separation of metals capable of behaving in aqueous medium similarly to zirconium and to hafnium and, hypothetically, of forming polymers with relatively high molecular masses. By definition, the process applies to metals which are soluble in an aqueous medium but which behave in such a medium such that they cannot pass through a nanofiltration membrane (e.g., a nanofiltration membrane having a cutoff threshold comprised between 200 and 2 000 g/mol, for example—1 000 g/mol), which hypothetically will be due to the abovementioned polymeric state.

A subject matter of the present invention 15 therefore a process for separating a metal 1 from a metal 2, starting from a solution of these metals in an aqueous medium, e.g. water, in which solution these metals are in a state which does not allow them to pass through a nanofiltration membrane, in which process the aqueous medium is treated with a ligand which complexes with the metal 1 and/or with the metal 2, for example with zirconium and/or with hafnium, and then the medium, thus treated, is passed over a filtration membrane which allows ligand/metal complexes to cross but which retains the metal not complexed with the ligand. The ligand used has a complexation constant with the metal, e.g. with Zr and Hf, which, is sufficiently high to "break" the polymers and thus to form ligand metal complexes, the molecular mass of which is lower than that of the polymers and than the cutoff threshold of the filtration membrane.

Mention may be made, as metals targeted by the invention, of: Zr, Hf, Al, Ti Or Si. It may thus be a matter of the Zr—Ti or Al—Si pairs and more particularly of the Zr—Hf pair.

In solution, the metals are in the form of salts. These salts may be of various types, for example chlorates, e.g. $MOCl_2$, perchlorates or nitrates, e.g. $MO(NO_3)_2$ (M metal, e.g. Zr or Hf).

The aqueous medium in which the metals are in solution and in the polymeric state may be at acidic pH and more particularly at highly acidic pH. The pH depends, of course, on the metals treated. Typically, the top limit is the pH at which the metals begin to precipitate. The bottom limit may be imposed by the resistance of the filtration membrane to the acidic conditions and by the behavior of the metals. Generally, the pH will be less than or equal to 4, in particular between 1 and 4, preferably between 2 and 4 (in all the ranges indicated here, the limits are included). These ranges of values are appropriate for the separation of Zr and Hf.

Filtration membrane and ligand are chosen as a function of one another. More specifically, the cutoff threshold of the membrane must be such that the ligand-metal complex can pass through the membrane. Furthermore, it is obvious that the cutoff threshold of the membrane must be such that the polymer formed by the metals in aqueous medium cannot pass through the membrane. Routine tests make it possible for a person skilled in the art to select the best ligand/membrane compromise.

Use may in particular be made, as filtration membrane, of nanofiltration membranes having cutoff thresholds of between 200 and 2 000 g/mol (they can thus be used for ligand-metal complexes having a molar mass which allows them to pass through the above-defined membrane, for example with a molar mass comprised between approximately 200 and 2 000 g/mol) and ultrafiltration membranes having cutoff thresholds of greater than 2 000 g/mol.

By way of example, EDTA forms, with zirconium and hafnium, complexes having a size comprised between 400 and 500 g/mol, and a nanofiltration membrane having a cutoff threshold of approximately 1 000 g/mol proves to be suitable.

As regards the ligand, the ideal is to use a ligand specific for one of the two metals to be separated which results in an optimum degree of separation. In the case of zirconium and hafnium, such a ligand complexes with zirconium or with hafnium. Use may also be made of a ligand capable of complexing both metals, e.g. hafnium and zirconium, but with different complexation constants, which makes it possible to recover by filtration a first fraction comprising the ligand-metal complex having the highest complexation constant. As will be seen later, the amount of ligand selected is then chosen in order to have the best degree of separation.

The ligand has to be soluble in water, as well as the complexes which it forms with the metal in solution. The ligand may be organic.

It may relate to compounds of poly(amino acid) type, in particular those corresponding to the formula (1):

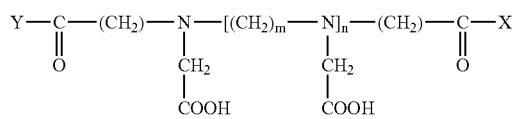

in which:
  n=0 to 3,
  m=1 to 4, preferably m=2,
  X and Y are identical or different and represent hydrophilic radicals, in particular of OH or $NR^1R^2$ type, with $R^1$ and $R^2$, which are identical or different, each corresponding to hydrogen or to a hydrophilic monovalent radical preferably selected from aminated and/or (poly) hydroxylated and/or (poly)etherified hydrocarbonaceous residues, these residues preferably being of the cycloalkyl, aralkyl, alkylaryl, cycloalkenyl, aralkenyl, alkenylaryl or aryl type, the number of carbon atoms of which can vary within wide proportions: the molecular mass of the compound results therefrom, and therefore the choice of a filtration membrane having a cutoff threshold greater than this molecular mass; generally, these residues will have in particular from 2 to 50 carbon atoms, preferably from 4 to 25;

and cyclic poly (amino acids, such as, for example, cyclic polyaminocarboxylates, such as DOTA:

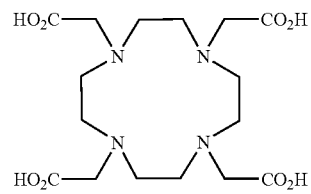

Mention may in particular be made, as ligand corresponding to this definition, of:
  EDTA or ethylenediaminetetraacetic acid
  M=292 g/mol

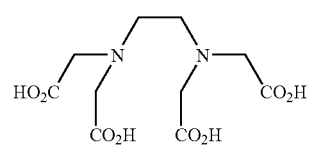

diamido-EDTA
M=290 g/mol

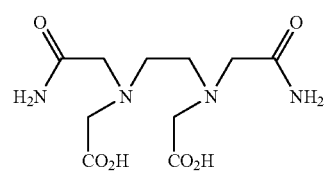

Diamido-EDTA can be produced from commercial EDTA anhydride (e.g. Aldrich) by reacting $NH_3$ in aqueous medium. It can also be produced according to the method described in Roy P. Houghton and Williams Emyr; JCPRB4; J. Chem. Soc. Perkin Trans. 1, EN, 11, 1982, 2693–2696.

In the first stage of the process according to the invention, the water-soluble ligand according to the invention is added to the aqueous medium to be treated. The amount of ligand added is preferably such that the ligand concentration/concentration of metal having the highest complexation constant ratio results in the best decree of separation (information accessible by routine tests); the ratio is in particular comprised between 0.5 and 2, more particularly between 0.8 and 1.7, preferably between 0.9 and 1.6, typical values being, for example, equal to or in the vicinity of 1 or 1.5. Generally, these ligands form complexes of 1:1 type.

It has been seen that the process according to the invention is carried out on metal) salts in solution in an aqueous medium. The process according to the invention can thus, also comprise, when this is necessary or desired, an initial stage which makes it possible to prepare such a solution. To do this, use may be made of any known method for obtaining such a solution of metal salts. For example, treatment with nitric acid in an aqueous medium, e.g. according to U.S. Pat. No. 2,285,443 or GB-A-555988.15, can be carried out, to give $MO(NO_3)_2$ salts.

In conventional processes for the production of zirconium metal, the zirconium and the hafnium are encountered essentially in the form of tetrachlorides. They are encountered, for example, in this form at the end of the carbochlorination of zircon. The mixture of the tetrachlorides can be directly dissolved in an aqueous medium, e.g. water, at acidic: pH, which gives $MOCl_2$ (M for Zr or Hf) salts. In an alternative form, the mixture of tetrachlorides can be treated with nitric acid, as indicated above.

In other conventional processes for the production of zirconium metal, the zirconium and the hafnium are encountered in the oxide form $MO_2$. Here again, use may be made of the treatment with nitric acid. Such a reaction can be written, for example, as follows:

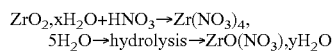
$$5H_2O \rightarrow hydrolysis \rightarrow ZrO(NO_3), yH_2O$$

in the general scheme for the production of zirconium metal (zircon→carbochlorination→extractive distillation or liquid-liquid separation), the process according to the invention may substitute for the separation stage, with or without pretreatment at the end of the carbochlorination.

To carry out the separation, the aqueous medium to be treated is circulated in the vicinity of the filtration, membrane and a difference in pres=ere is applied between the two opposite faces of the membrane.

The filtration membranes may be organic, inorganic or organic/inorganic. They advantageously comprise or are advantageously composed of polymers, such as polyaramides, sulfonated polysulfones, polybenzimidazolones, grafted or engrafted poly(vinylidene fluoride)s, polyamides, cellulose esters, cellulose ethers or perfluorinated monomers, the combinations of these polymers and the copolymers obtained from monomers of at least two of these polymers. For further details, a person skilled in the art may refer to WO-A-92/06675, which discloses organic/inorganic nanofiltration membranes comprising an active layer of a polymer of the polysulfone, polybenzenimidazolone, grafted poly(vinylidene fluoride) and perfluorated ionomer (Nafion®) type—cutoff threshold of 300 to 1 000 g.mol$^{-1}$; or to FR-A-2 600 264, which discloses organic/inorganic membranes comprising a porous and organic support and a microporous membrane node of organic polymer, such as polysulfone, polyamide, cellulose ester and cellulose ether.

Mention may be made, as examples of membranes, of the membranes marketed by the firm Osmonics under the names of Sepa MG 17, Sepa MW-15 and Sepa BQ-01, which have a permeability to double-distilled water comprised between 2 and 10 $1.h^{-1}.m^{-2}.bar^{-1}$ at 25° C.

Use may be made of the tangential filtration technique, which has the advantage of limiting the phenomenon of the accumulation of the entities retained at the surface of the membrane and thus of making possible continuous operation.

Use may also be made of filtration modules in the form of tubes or cylinders or of parallel plates or alternatively of membranes wound around a perforated tube or cylinder intended to collect the permeate. These modules may be arranged in series and/or in parallel, with optionally different membranes in some modules.

The difference in pressure applied and the rate of circulation of the retentate and the temperature are adjustable parameters.

Very advantageously, it is not necessary to operate at high temperature, as in the processes of the prior art. Even temperatures which might exceed the thermal resistance of the membranes used are avoided. Generally, it may be specified that the operation is performed at between 0 and 50° C. and more advantageously at ambient temperature (25° C.) or in the vicinity of the latter, e.g. between 20 and 35° C.

The differences in pressure and rate of circulation of the retentate are first and foremost set as a function of the desired flowrate and of the characteristics of the membrane, e.g. its resistance to the pressure. Simple tests make it possible to determine the optimum conditions.

However, it may be specified that the difference in pressure may advantageously vary between 0.2 and 1.5 Mpa, e.g. between 0.2 and 0.8 MPa.

After its separation, the ligand-metal complexes may be treated using appropriate decomplexing agent(s), so as to collect, on the one hand, the ligands (which can be recycled) and, on the other hand, the metal.

According to the choice of the ligand and of the complexation constant which results therefrom, a given metal, e.g. zirconium, is reencountered either in the retentate (case of zirconium with EDTA) or in the permeate, in the form of a complex with the ligand.

The metal in the retentate may be recovered, for example, by basifying, e.g. to pH 10, or by evaporation.

The complexed metal car, after filtration, be released or decomplexed, for example in a basic medium and by precipitation of its hydroxide or by passing through a specific ion-exchange resin. In the context of this stage, it is advantageous to provide, in accordance with the invention, for a removal of the solvent, in this instance water, for example by evaporation, to make possible recovery of the metal.

The apparatus required for the implementation of the process according to the invention is relatively limited since a complexation reactor, a pump and at least one filtration membrane, e.g. nanofiltration membrane, are sufficient. In addition, the apparatus is readily available commercially. By way of example, the basic plant may comprise a complexation reactor, a pump and a filtration module, e.g. nanofiltration module, e.g. tangential module, designed so that the retentate, after it has passed in the vicinity of the membrane, is recycled upstream of the filtration module, preferably in the complexation reactor. According to a specific form of the invention, the reactor may be fed continuously or semicontinuously with the ligand and the mixture of metals.

The (nano)filtration may advantageously comprise several stages, in series and/or in parallel, so as to increase the degree of separation or of enrichment, permeate and/or retentate being subjected to the number of treatment and (nano)filtration steps required by the objective to be achieved.

Likewise, successive complexing-(nanofiltration operations with identical or different ligands may be carried out.

DETAILED DESCRIPTION

EXAMPLE 1

Not in Accordance with the Invention

In this example, the retention of zirconium in the form of zirconyl dinitrate is studied by treating an aqueous solution comprising 0.259 mmol/l of $ZrO(NO_3)_2$. A flat filtration module equipped with a Sepa MG-17 membrane (with a surface area S=0.015 m$^2$) is used. The membrane exhibits a permeability to double-distilled water of 3.6 $1.h.^{-1}.m^{-2}.bar^{-1}$ at 25° C.

This study is performed under the following conditions:
transmembrane pressure ΔP=0.6 MPa,
temperature=20° C.,
flowrate of retentate=40 1/h,
pH=3.6.

Several experiments were performed by adding amounts of zirconyl dinitrate varying from 0 to 11.7 mmol.

The results obtained show that the degree of retention of the Sepa MG-17 membrane with respect to the zirconyl dinitrate is >99-99%.

EXAMPLE 2

In this example, an aqueous solution comprising 0.1 mmol/l of zirconium and 0.1 mmol/l of hafnium in the form of zirconyl dinitrate and hafnyl dinitrate is treated. A flat filtration module equipped with the Sepa MG-17 membrane (with a surface area S=0.015 m$^2$) is used. The membrane exhibits a permeability to double-distilled water of 3.6 $1.h^{-1}.m^{-2}.bar^{-1}$ at 25° C. A complexing agent composed of EDTA (Complexation constants: $K_{Zr\text{-}EDTA}=10^{28.1}$, $K_{Hf\text{-}EDTA}=10^{29.5}$, from where $K_{Hf}/K_{Zr}=25$) is added to the aqueous solution to be treated.

The Hf/Zr separation is performed under the following conditions:
transmembrane pressure ΔP=0.6 MPa,
temperature=20° C.,
flowrate of retentate=40 1/h,
pH=2.

Three experiments are performed while adding the complexing agent at concentrations varying from 0 to 2 equivalent of EDTA unit per zirconium atom.

Figure 1:
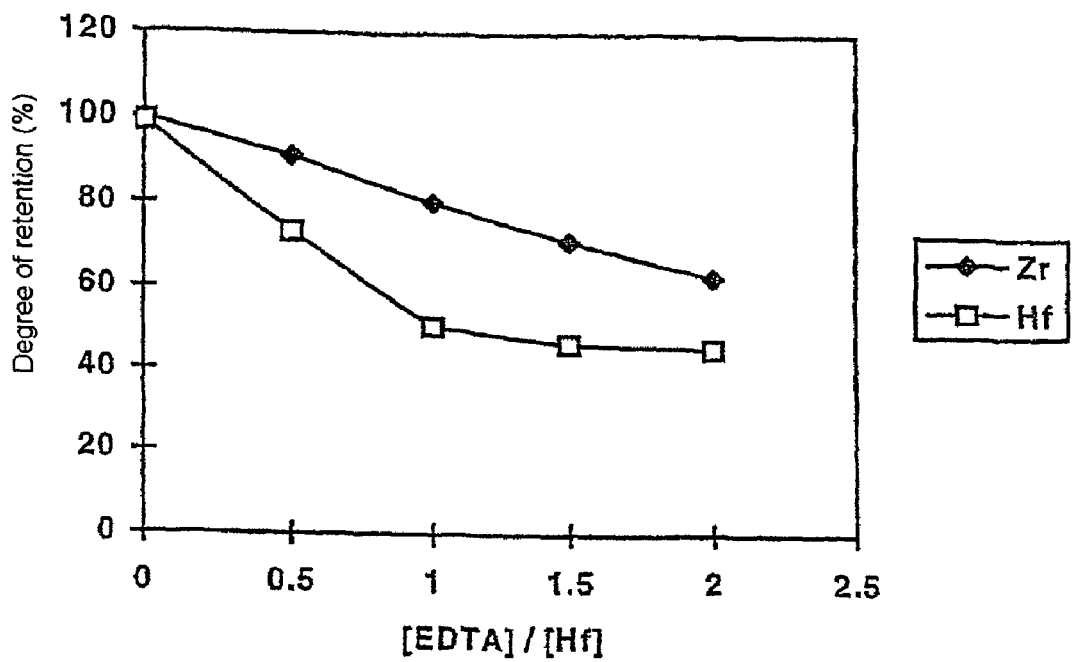
FIG. 1 is a curve of the degree of retention in % as a function of the concentration of ligand EDTA, corresponding to example 2.

The results of the experiments are given in FIG. 1.

The results of FIG. 1 show that the degree of retention of the zirconium is greater than that of the hafnium when the solution comprises from 0 to 2 equivalents of EDTA units per zirconium atom. The difference between the degree of retention of the zirconium and that of the hafnium is at a maximum when the [complexing agent]/[zirconium] ratio is equal to 1. This difference then has a value of 30%.

EXAMPLE 3

In this example, an aqueous solution comprising 2 mmol/l of zirconium and 2 mmol/l of hafnium in the form of zirconyl dinitrate and hafnyl dinitrate is treated. A flat filtration module equipped with the BP-02 membrane (with a surface area S=0.015 m$^2$) is used. The membrane exhibits a permeability to double-distilled water of 3.6 $1.h^{-1}.m^{-2}.bar^{-1}$ at 25° C. A complexing agent consisting of EDTA is added to the aqueous solution to be treated.

The Hf/Zr separation is performed under the following conditions:
transmembrane pressure ΔP=0.6 MPa,
temperature=20° C.,
flowrate of retentate=40 1/h,
pH=2.2.

Several experiments are performed while adding the complexing agent at concentrations varying from 0 to 2 equivalents of EDTA units per zirconium atom.

Figure 2:
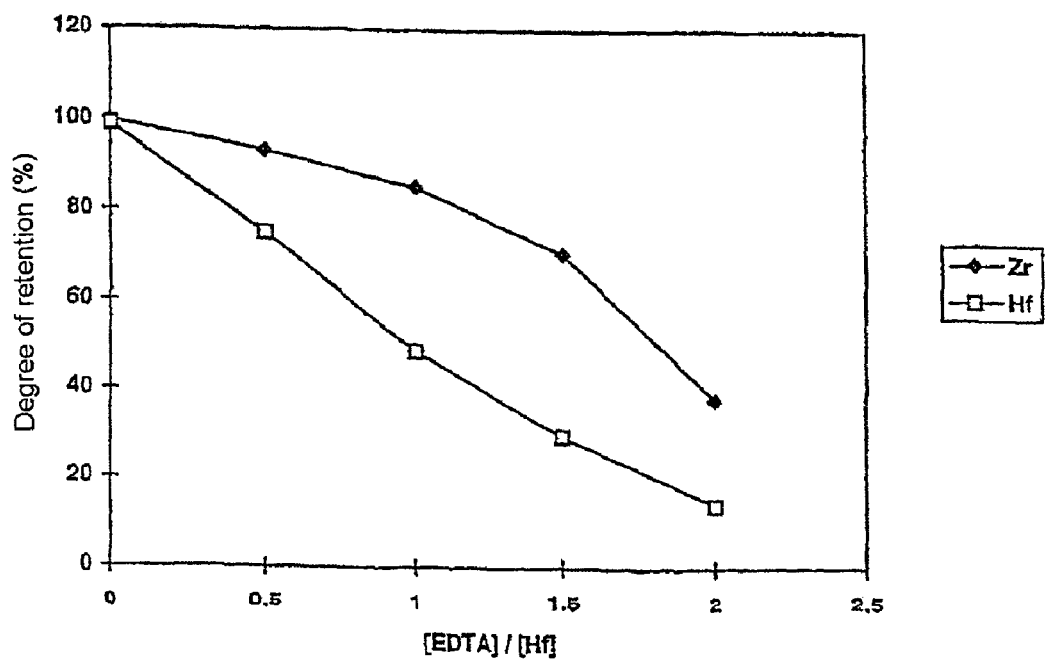
FIG. 2 is a curve of the degree of retention in % as a function of the concentration of ligand EDTA, corresponding to example 3.

The results of the experiments are given in FIG. 2.

The results of FIG. 2 show that the degree of retention of the zirconium is greater than that of the hafnium when the solution comprises from 0 to 2 equivalents of EDTA unit per zirconium atom. The difference between the degree of retention of the zirconium and that of the hafnium is at a maximum when the [complexing agent]/[zirconium] ratio is equal to 1.5. This difference then has a value of 41%.

It should be clearly understood that the invention defined by the appended claims is not limited to the specific embodiments indicated in the above description but encompasses the alternative forms which depart neither from the scope nor from the spirit of the present invention.

The invention claimed is:

1. A process for separating a metal 1 from a metal 2 starting from a solution of the metals in an aqueous medium in which the metals form at least one of polymers and copolymers that do not pass through a nanofiltration membrane, the process comprising the steps of:
   treating the aqueous medium with a ligand which complexes with one of the metal 1 and the metal 2; and
   passing the aqueous medium over a filtration membrane, after the treating, which allows ligand-metal complexes to pass but which retains the metals not complexed with the ligand.

2. A process for separating a metal 1 from a metal 2 starting from a solution of the metals in an aqueous medium in which the metals are in a state which does not allow the metals to pass through a nanofiltration membrane, the process comprising the steps of:
   treating the aqueous medium with a ligand which complexes with at least one of the metal 1 and with the metal 2; and
   passing the aqueous medium over a filtration membrane, after the treating which allows ligand-metal complexes to pass but retains the metals not complexed with the ligand wherein the metals are zirconium and hafnium in solution in an acidic aqueous medium.

3. The process according to claim 2, wherein the metals zirconium and hafnium are in solution in an acidic aqueous medium having a pH of one of less than and equal to 4.

4. The process according to claim 3, wherein the pH is between 1 and 4.

5. The process according to claim 3, wherein the pH is between 2 and 4.

6. The process according to claim 1, wherein metal 1 and metal 2 are zirconium and hafnium, and the ligand complexes with one of zirconium and hafnium.

7. The process according to claim 1, wherein metal 1 and metal 2 are zirconium and hafnium, and the ligand complexes with zirconium and with hafnium with different complexation constants and further comprising:
   recovering by filtration a first fraction, having a ligand/metal complex having a highest complexation constant.

8. The process according to claim 1, wherein the ligand is a poly(amino acid).

9. The process according to claim 1, wherein the ligand is a cyclic poly(amino acid).

10. The process according to claim 1, wherein the ligand is a poly(amino acid) of formula (1):

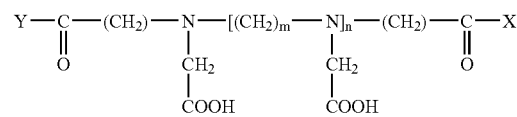

in which:
n=0 to 3,
m=1 to 4,
X and Y are one of identical and different and represent hydrophilic radicals of one of OH and $NR^1R^2$, with $R^1$ and R², which are one of identical and different, each corresponding to one of hydrogen and a hydrophilic monovalent radical.

11. The process according to claim 10, wherein the hydrophilic monovalent radical is selected from at least one of aminated and (poly)hydroxylated and (poly) etherified hydrocarbonaceous residues.

12. The process according to claim 11, wherein the residues are one of cycloalkyl, aralkyl, alkylaryl, cycloalkenyl, aralkenyl, alkenylaryl or aryl configurations.

13. The process according to claim 10, wherein the ligand is EDTA.

14. The process according to claim 10, wherein the ligand is diamido-EDTA.

15. The process according to claim 9, wherein the ligand is DOTA.

16. The process according to claim 1, wherein an amount of ligand added is such that a ligand concentration/concentration of metal having a strongest complexation constant ratio is between 0.5 and 2.

17. The process according to claim 1, wherein an amount of ligand added is such that a ligand concentration/concentration of metal having a strongest complexation constant ratio is between 0.8 and 1.7.

18. The process according to claim 17, wherein the ratio is between 0.9 and 1.6.

19. The process according to claim 1, wherein the filtration membrane is a nanofiltration membrane.

20. The process according to claim 1, wherein the filtration membrane is an ultrafiltration membrane.

21. The process according to claim 1, wherein the process is performed at a temperature between 0 and 50° C.

22. The process according to claim 21, wherein the temperature is between 20 and 35° C.

23. The process according to claim 1, wherein the metals are in solution in the aqueous medium in a form of one of salts of chlorate, perchlorate and nitrate.

24. The process according to claim 23, wherein metal 1 and metal 2 are zirconium and hafnium, and zirconium and hafnium are in a form of one of $MOCl_2$ and $MO(NO_3)_2$ salts, with M being one of Zr and Hf.

25. A process for separating a metal 1 from a metal 2 starting from a solution of the metals in an aqueous medium in which the metals are in a state which does not allow the metals to pass through a nanofiltration membrane, the process comprising the steps of:
    treating the aqueous medium with a ligand which complexes with at least one of the metal 1 and with the metal 2; and
    passing the aqueous medium over a filtration membrane, after the treating, which allows ligand-metal complexes to pass but retains the metals not complexed with the ligand wherein the process is applied to a $ZrCl_4+HfCl_4$ mixture.

26. A process for separating a metal 1 from a metal 2 starting from a solution of the metals in an aqueous medium in which the metals are in a state which does not allow the metals to pass through a nanofiltration membrane, the process comprising the steps of:
    treating the aqueous medium with a ligand which complexes with at least one of the metal 1 and with the metal 2; and
    passing the aqueous medium over a filtration membrane, after the treating, which allows ligand-metal complexes to pass but and retains the metals not complexed with the ligand wherein the process is applied to one of a $ZrO_2+HfO_2$ and $ZrCl_4+HfCl_4$ mixture which has been subjected to treatment with nitric acid.

* * * * *